Oct. 27, 1959    J. S. FREISMUTH ET AL    2,910,242
MIXING VALVE
Filed Sept. 24, 1956
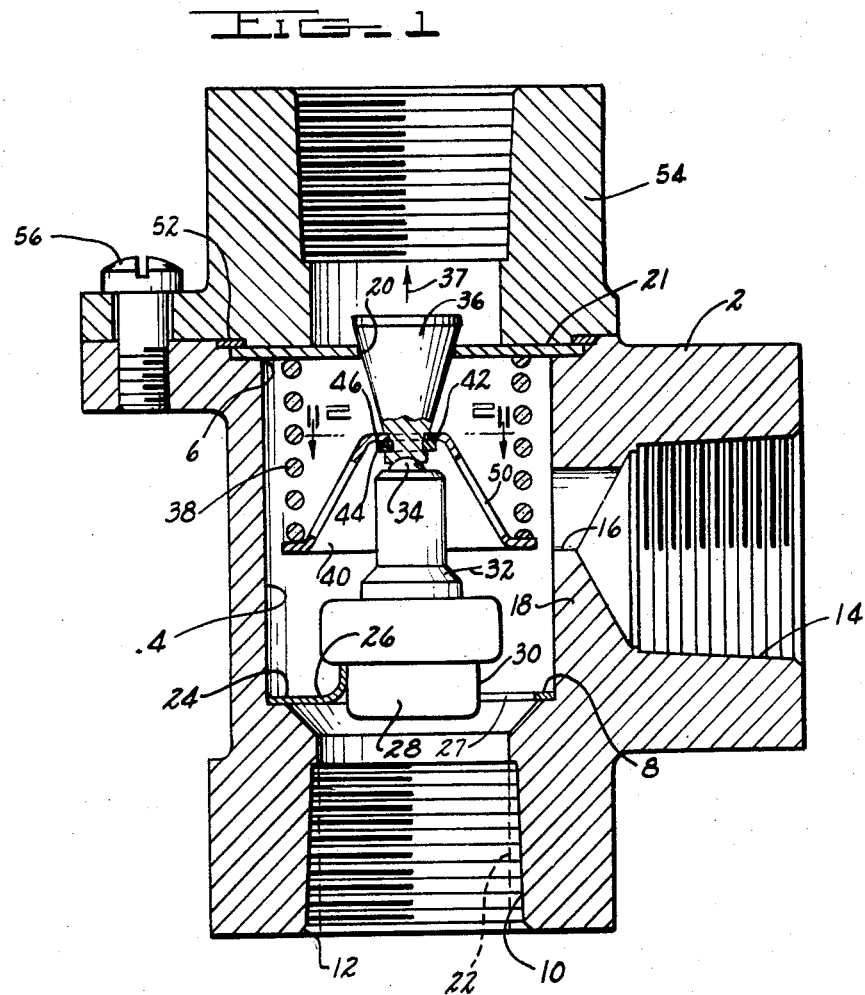
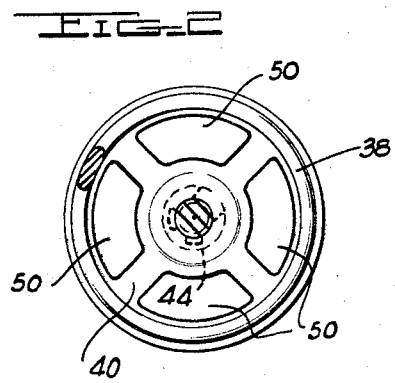
INVENTORS
JOHN S. FREISMUTH
DANIEL R. TERRANCE
BY
SMITH, OLSEN, LEWIS & McRAE
ATTORNEYS United States Patent Office 2,910,242
Patented Oct. 27, 1959

2,910,242

MIXING VALVE

John S. Freismuth, St. Clair Shores, and Daniel R. Terrance, Detroit, Mich., assignors to American Radiator & Standard Sanitary Corporation, New York, N.Y., a corporation of Delaware Application September 24, 1956, Serial No. 611,537

1 Claim. (Cl. 236—12)

This invention relates to a thermostatically operated valve, useful for example in a clothes washing machine as a device for mixing hot and cold water so as to produce a flow of intermediate temperature water.

Objects of the invention are, singly and collectively, to provide a thermostatically operated valve wherein:

(1) The valve housing may be economically formed, as for example by a forging operation.

(2) The valve housing may be of "leak-proof" construction so as to reduce the number of "scrap" parts and eliminate the necessity for testing each housing as to its "leak" characteristics.

(3) The valve can be constructed as a comparatively small size item, thereby decreasing material costs and increasing the adaptability of the valve for use in small spaces.

(4) The valve parts can be quickly assembled into the valve housing without any expensive brazing, welding or similar assembly operations.

Other objects of this invention will appear in the following description and appended claim, reference being had to the accompanying drawings forming a part of this specification wherein like reference characters designate corresponding parts in the several views.

In the drawings:

Fig. 1 is a sectional view through one embodiment of the invention.

Fig. 2 is a sectional view on line 2—2 in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a valve comprising a housing member 2 which is preferably formed by a forging operation. Member 2 is recessed to form a parallel walled chamber 4 extending from an inlet opening 6 to an annular shoulder 8. There extends from shoulder 8 a threaded passage 10 which forms an outlet opening 12. A threaded inlet passage for hot fluid is provided at 14. The downstream portion 16 of passage 14 is of reduced cross-section whereby to form a dam 18, the purpose of dam 18 being to promote a better mixing action between the hot fluid from passage 16 and the cold fluid approaching from inlet port 20 in wall member 21.

When housing member 2 is formed by a forging operation the male forging die preferably forms the surfaces which define chamber 4 as well as the dotted line surface indicated by numeral 22. The threaded surface which defines passage 10, as well as the surfaces which define passage portions 14 and 16, are formed after the forging operation. The threaded surface at 10 is formed by a tapping operation; while the surfaces at 14 and 16 are formed by drilling and tapping operations, and drilling operations, respectively.

Formation of member 2 by a forging operation is made possible by the "parallel walled" design of chamber 4, it being appreciated however that the surfaces of chamber 4 could diverge in directions away from shoulder 8 and still permit formation of member 2 by a forging operation; the essential requisite being that there are no hidden recesses in chamber 4, i.e. that all of the chamber-forming surfaces are in visual communication with opening 6.

One advantage of a valve housing construction formed by a forging operation is the economy and quickness of the formation process, as contrasted for example with a casting operation wherein breakable sand cores must be built for the formation of each housing member unit. Another advantage of a forged valve housing is its relatively "imporous" character which eliminates leakage through the valve housing walls and reduces the number of "scrap" parts.

In its finally assembled form the illustrated valve includes a support means in the form of an annular plate member 24 having a plurality of integrally formed fingers 26 extending inwardly toward the axis of chamber 4 and then in an upstream direction in close proximity to the exterior surface 30 of a cup member 28. The spaces 27 between the various fingers 26 allow fluid to flow from inlets 16 and 20 around cup member 28 toward outlet 12. Member 28 forms one component part of a thermostatic power element which may be constructed as shown in Fig. 7 of U.S. Patent No. 2,636,776. The power element includes a body of thermally expansible material within cup 28, a sleeve 32 extending from cup 28, and a piston 34 slidably mounted in sleeve 32.

Operation of the power element is such that when the expansible material in cup 28 is heated (as by a rush of hot fluid from passage 16) piston 34 is forced out of sleeve 32 so as to move port-closing element 36 in the arrow 37 direction; thereby opening port 20 and admitting cold fluid into chamber 4 so as to decrease the temperature of fluid surrounding cup 28 and produce a relatively constant temperature fluid in outlet passage 10.

In order to return piston 34 into sleeve 32, as on temperature decrease of the expansion material in cup 28 there is provided a compression spring 38. Spring 38 acts against a bell-shaped abutment member 40 which is positioned against a shoulder 42 formed on element 36. A C-shaped retainer ring 44 seats in a groove 46 to retain member 40 against shoulder 42. The engaged surfaces of piston 34 and element 36 are spherical so as to provide a "self-aligning" construction in which parts jamming is eliminated.

The relative sizes of the various chambers, passages and ports are such that the convolutions of spring 38 are positioned quite closely together at high fluid temperatures. This positioning of the coil convolutions would tend to prevent the desired flow of cold fluid from port 20 except that openings 50 have been provided in member 40 so as to permit the desired cold fluid flow. The illustrated design of parts is advantageous in that it permits formation of the valve as a small compact item requiring minimum raw material expense and permitting installation of the valve in small spaces.

Assembly of the valve parts into housing 2 is effected by first positioning member 24 on shoulder 8 with the power element engaged against fingers 26. Elements 21, 36, 38, 40 and 44 are assembled together as a unit prior to their insertion into housing 2; the last step in this assembly operation being to position ring 44 in groove 46. This assembly of elements may then be easily inserted into its illustrated position. Thereafter an annular gasket 52 is positioned over member 21, and a conduit-coupling member 54 is fastened onto member 2 by screws 56 so as to retain the valve parts in their operative positions. It will be noted that each of the valve parts is of economical construction, and no expensive welding, brazing, soldering or similar operations are required to assemble the various parts together.

We claim:

A valve comprising a housing internally contoured to define a cylindrical chamber extending from its inlet opening toward but terminating short of its outlet opening; said outlet opening being formed by a passage extending from the downstream end of said cylindrical chamber; the diameter of the chamber being greater than the diameter of the passage whereby to form a shoulder at the juncture therebetween; an annular plate positioned on said shoulder and having a plurality of integrally formed fingers extending inwardly toward the chamber axis and then toward the inlet opening so as to form seating surfaces facing said opening; a second plate positioned across the inlet opening and having an aperture therein forming an inlet port; a port-closing element having an enlarged portion positioned on the upstream side of the second plate but having a reduced portion extending through the port; a thermostatic power element including a cup fitting between the fingers and having a rim portion positioned on the aforementioned seating surfaces, a sleeve member extending from the cup toward the second plate, and a piston slidably positioned in said sleeve member and having a spherical end engaged with the reduced portion of the port-closing element; said reduced portion having a spherical recess receiving said spherical end; said thermostatic element acting on temperature increase to force the port-closing element in an upstream direction; a bell-shaped abutment member carried by the reduced portion of the port-closing element; and coil spring means compressively positioned between the abutment member and second plate whereby to return the port-closing element toward closed position during temperature decrease of the theromstatic element; said bell-shaped member being provided with a series of openings for the passage of fluid therethrough even when the spring convolutions are in close proximity to one another.

References Cited in the file of this patent
UNITED STATES PATENTS

| | | |
|---|---|---|
| 1,850,963 | Sponar | Mar. 22, 1932 |
| 1,927,054 | William | Sept. 19, 1933 |
| 2,326,096 | Dillman | Aug. 3, 1943 |
| 2,636,776 | Vernet | Apr. 28, 1953 |
| 2,657,859 | Wangenheim | Nov. 3, 1953 |